(12) United States Patent
Uziel et al.

(10) Patent No.: US 11,979,235 B2
(45) Date of Patent: May 7, 2024

(54) RELAYING PHYSICAL SIDELINK CONTROL CHANNEL RESOURCES

(71) Applicant: QUALCOMM Incorporated, San Diego, CA (US)

(72) Inventors: Lior Uziel, Hod Hasharon (IL); Omri Netanel Mamo, Petah Tikva (IL); Guy Wolf, Rosh Haayin (IL)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 17/319,699

(22) Filed: May 13, 2021

(65) Prior Publication Data

US 2021/0359788 A1    Nov. 18, 2021

Related U.S. Application Data

(60) Provisional application No. 63/025,724, filed on May 15, 2020.

(51) Int. Cl.
*H04L 1/08* (2006.01)
*H04W 72/20* (2023.01)

(52) U.S. Cl.
CPC .............. *H04L 1/08* (2013.01); *H04W 72/20* (2023.01)

(58) Field of Classification Search
None
See application file for complete search history.

(56) References Cited

U.S. PATENT DOCUMENTS

| 2021/0050931 | A1* | 2/2021 | Hahn | H04L 5/0007 |
| 2022/0217679 | A1* | 7/2022 | Zhao | H04W 4/70 |
| 2022/0303985 | A1* | 9/2022 | Miao | H04W 72/0446 |
| 2022/0377722 | A1* | 11/2022 | Yao | H04L 1/1896 |

FOREIGN PATENT DOCUMENTS

| NO | 2016182601 A1 | 11/2016 |
| WO | 2020056068 A1 | 3/2020 |

OTHER PUBLICATIONS

International Search Report and Written Opinion—PCT/US2021/032578—ISA/EPO—dated Sep. 22, 2021.
Partial International Search Report—PCT/US2021/032578—ISA/EPO—dated Jul. 27, 2021.

* cited by examiner

*Primary Examiner* — Nguyen H Ngo
(74) *Attorney, Agent, or Firm* — QUALCOMM Incorporated

(57) ABSTRACT

Certain aspects of the present disclosure provide techniques for relaying physical sidelink control channel in sidelink communications. A method that may be performed by a first user equipment (UE) includes receiving a sidelink control information (SCI) transmission from a second UE, the SCI pointing to one or more resources for a retransmission of the SCI by the second UE. The method may include transmitting the SCI to a third UE using the one or more resources for the retransmission of the SCI by the second UE.

30 Claims, 14 Drawing Sheets

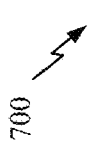

| Parameters | | Sidelink Transmission | |
|---|---|---|---|
| | | PSCCH | |
| | | Sidelink Transmission Modes 1 and 2 | Modes 3 and 4 |
| Group hopping | $n_{ID}^{RS}$ | disabled | disabled |
| | $n_s$ | - | - |
| | $f_{ss}$ | 0 | 8 |
| Sequence Hopping | | disabled | disabled |
| Cyclic Shift | $n_{cs,\lambda}$ | 0 | {0, 3, 6, 9} |
| Orthogonal Sequence | $[w^\lambda(\cdot)]$ | [+1 +1] | [+1 +1 +1 +1] |
| Reference Signal Length | $M_{sc}^{RS}$ | $M_{sc}^{PSCCH}$ | $M_{sc}^{PSCCH}$ |
| Number of Layers | $v$ | 1 | 1 |
| Number of Antenna Ports | $P$ | 1 | 1 |

FIG. 7

RELAYING PHYSICAL SIDELINK CONTROL CHANNEL RESOURCES

CROSS-REFERENCE TO RELATED APPLICATION(S)

This application claims benefit of and priority to U.S. Provisional Application No. 63/025,724, filed May 15, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for relaying physical sidelink control channel resources in sidelink communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include relaying physical sidelink control information.

Certain aspects of the subject matter described in this disclosure can be implemented in a method for wireless communication by a first user equipment (UE). The method generally includes receiving a sidelink control information (SCI) transmission from a second UE. The SCI points to one or more resources for a retransmission of the SCI by the second UE. The method generally includes transmitting the SCI to a third UE using the one or more resources for the retransmission of the SCI by the second UE.

Certain aspects of the subject matter described in this disclosure can be implemented in a method for wireless communication by a first user equipment (UE). The method generally includes receiving, from a second UE, a SCI retransmission for a third UE. The method generally includes determining, based on the received SCI retransmission, first one or more resources used by the third UE for a data retransmission. The method generally includes allocating resources for one or more subsequent transmissions, excluding second one or more resources used by the third UE for the SCI retransmission and the first one or more resources for the data retransmission.

Certain aspects of the subject matter described in this disclosure can be implemented in an apparatus for wireless communication by a first user equipment (UE). The apparatus generally includes at least one processor and a memory coupled to the at least one processor. The memory includes code executable by the at least one processor to cause the apparatus to receive a SCI transmission from a second UE. The SCI points to one or more resources for a retransmission of the SCI by the second UE. The memory includes code executable by the at least one processor to cause the apparatus to determine one or more resources for the retransmission of the SCI based on the received SCI. The memory includes code executable by the at least one processor to cause the apparatus to transmit the SCI to a third UE using the one or more resources for the retransmission of the SCI by the second UE.

Certain aspects of the subject matter described in this disclosure can be implemented in an apparatus for wireless communication by a first user equipment (UE). The apparatus generally includes at least one processor and a memory coupled to the at least one processor. The memory includes code executable by the at least one processor to cause the apparatus to receive, from a second UE, a SCI retransmission for a third UE. The memory includes code executable by the at least one processor to cause the apparatus to determine, based on the received SCI retransmission, first one or more resources used by the third UE for a data retransmission. The memory includes code executable by the at least one processor to cause the apparatus to allocate resources for one or more subsequent transmissions, exclude second one or more resources used by the third UE for the SCI retransmission and the first one or more resources for the data retransmission.

Certain aspects of the subject matter described in this disclosure can be implemented in an apparatus for wireless communication by a first user equipment (UE). The apparatus generally includes means for receiving a SCI transmission from a second UE. The SCI points to one or more resources for a retransmission of the SCI by the second UE. The apparatus generally includes means for transmitting the SCI to a third UE using the determined one or more resources for the retransmission of the SCI by the second UE.

Certain aspects of the subject matter described in this disclosure can be implemented in an apparatus for wireless communication by a first user equipment (UE). The apparatus generally includes means for receiving, from a second UE, a SCI retransmission for a third UE. The apparatus generally includes means for determining, based on the received SCI retransmission, first one or more resources used by the third UE for a data retransmission. The apparatus generally includes means for allocating resources for one or more subsequent transmissions, excluding second one or more resources used by the third UE for the SCI retransmission and the first one or more resources for the data retransmission.

Certain aspects of the subject matter described in this disclosure can be implemented in a computer readable medium storing computer executable thereon for wireless communication by a first user equipment (UE). The computer readable medium generally includes code for receiving a SCI transmission from a second UE. The SCI points to one or more resources for a retransmission of the SCI by the second UE. The computer readable medium generally includes code for transmitting the SCI to a third UE using the determined one or more resources for the retransmission of the SCI by the second UE.

Certain aspects of the subject matter described in this disclosure can be implemented in a computer readable medium storing computer executable thereon for wireless communication by a first user equipment (UE). The computer readable medium generally includes code for receiving, from a second UE, a SCI retransmission for a third UE. The method generally includes determining, based on the received SCI retransmission, first one or more resources used by the third UE for a data retransmission. The computer readable medium generally includes code for allocating resources for one or more subsequent transmissions, excluding second one or more resources used by the third UE for the SCI retransmission and the first one or more resources for the data retransmission.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

FIG. 7 is a table of parameters used for sidelink transmissions in C-V2X systems, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
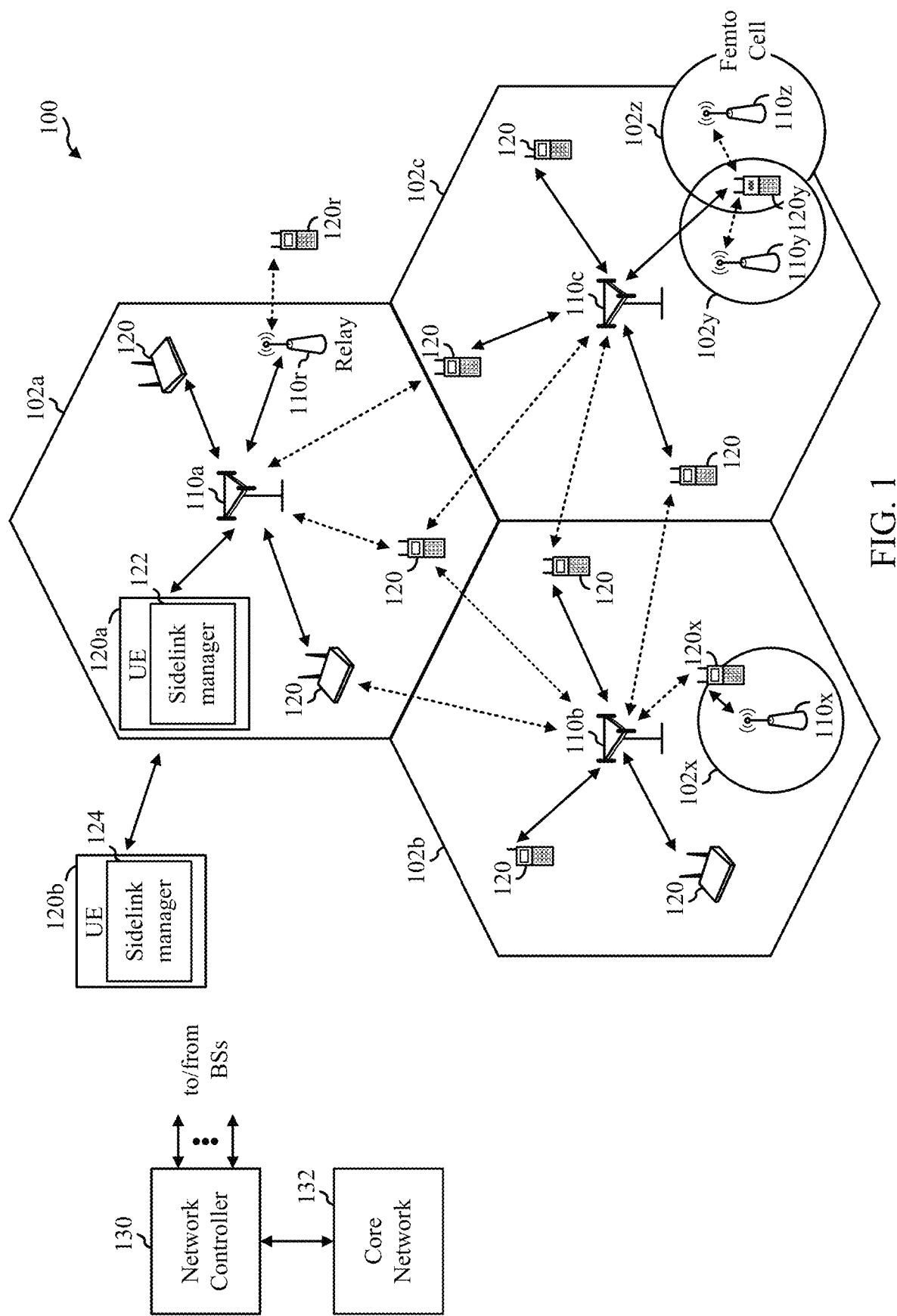
FIG. 1 is a block diagram conceptually illustrating an example wireless communication network, in accordance with certain aspects of the present disclosure.

Aspects of the present disclosure provide apparatus, methods, processing systems, and computer readable mediums for relaying physical sidelink control channel (PSCCH) communications, such as cellular vehicle-to-anything (C-V2X) direct communications.

In C-V2X systems, user equipment (UE), such as vehicular UEs, may directly communicate with each other using time-frequency resources autonomously selected by the UE. However, the autonomous selection of resources can cause problems when two UEs select the same resources, thereby causing packet collisions. For example, in some scenarios, a UE is "hidden" during channel sensing and an initial resource selection (e.g., an autonomous semi-persistent scheduling (SPS) resource selection), and may be interfering.

Accordingly, to avoid packet collisions, aspects of the present disclosure provide techniques for relaying PSCCH resources in sidelink communications. In some examples, a UE can relay sidelink control information (SCI) of another UE. Relaying the SCI by the UE echoes and reinforces the SCI of the other UE by transmitting the SCI on the same resources as the other UE. A hidden/aggressor UE may receive the echoed SCI, stop transmitting on the overlapping resources, and perform a new resource selection excluding the resources indicated by the received SCI.

The following description provides examples of relaying PSCCH resources in sidelink communications, and is not limiting of the scope, applicability, or examples set forth in the claims. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

Example Wireless Communication Network

New radio access, such as 5G NR, may support various wireless communication services, such as enhanced mobile broadband (eMBB) targeting wide bandwidth, millimeter wave (mmW), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. Multiple input multiple out (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more base station (BSs) 110*a-z* (each also individually referred to herein as BS 110 or collectively as BSs 110) and/or user equipment (UE) 120*a-y* (each also individually referred to herein as UE 120 or collectively as UEs 120) in the wireless communication network 100 via one or more interfaces.

According to certain aspects, the UEs 120 may be configured for sidelink communications. As shown in FIG. 1, the UE 120*a* includes a sidelink manager 122 that may be configured for relaying the SCI of another UE, in accordance with aspects of the present disclosure. A UE 120*b* may include a sidelink manager 112 that may be configured to receive the broadcast SCI and re-determine the sidelink resource allocation excluding resources indicated in the SCI.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells.

The BSs 110 communicate with UEs 120 in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
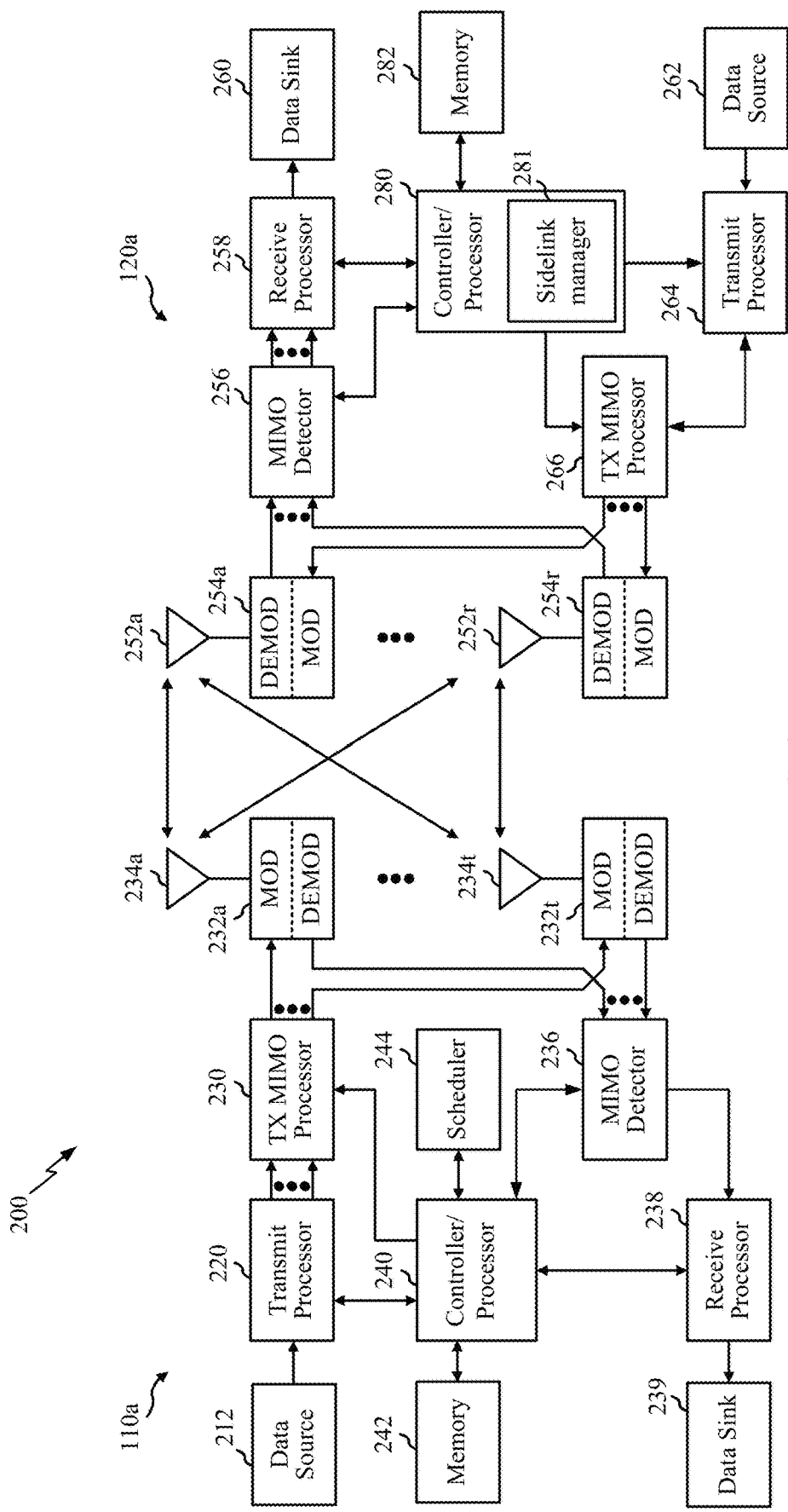
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a (or similarly at the UE 120b), the antennas 252a-252r may receive the downlink signals from the BS 110a and may provide received signals to the demodulators (DEMODs) in transceivers 254a-254r, respectively. Each demodulator in transceivers 254a-243r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink and/or sidelink, at UE 120a, a transmit processor 264 may receive and process data (e.g., for the physical uplink shared channel (PUSCH)) from a data source 262 and control information (e.g., for the physical uplink control channel (PUCCH) or physical sidelink control channel (PSSCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a or UE 120b. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a may be used to perform the various techniques and methods described herein. As shown in FIG. 2, the controller/processor 280 of the UE 120a has a sidelink manager 281 that may be configured for relaying PSCCH resources in sidelink communications, according to aspects described herein. Although shown at the controller/processor, other components of the UE 120a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
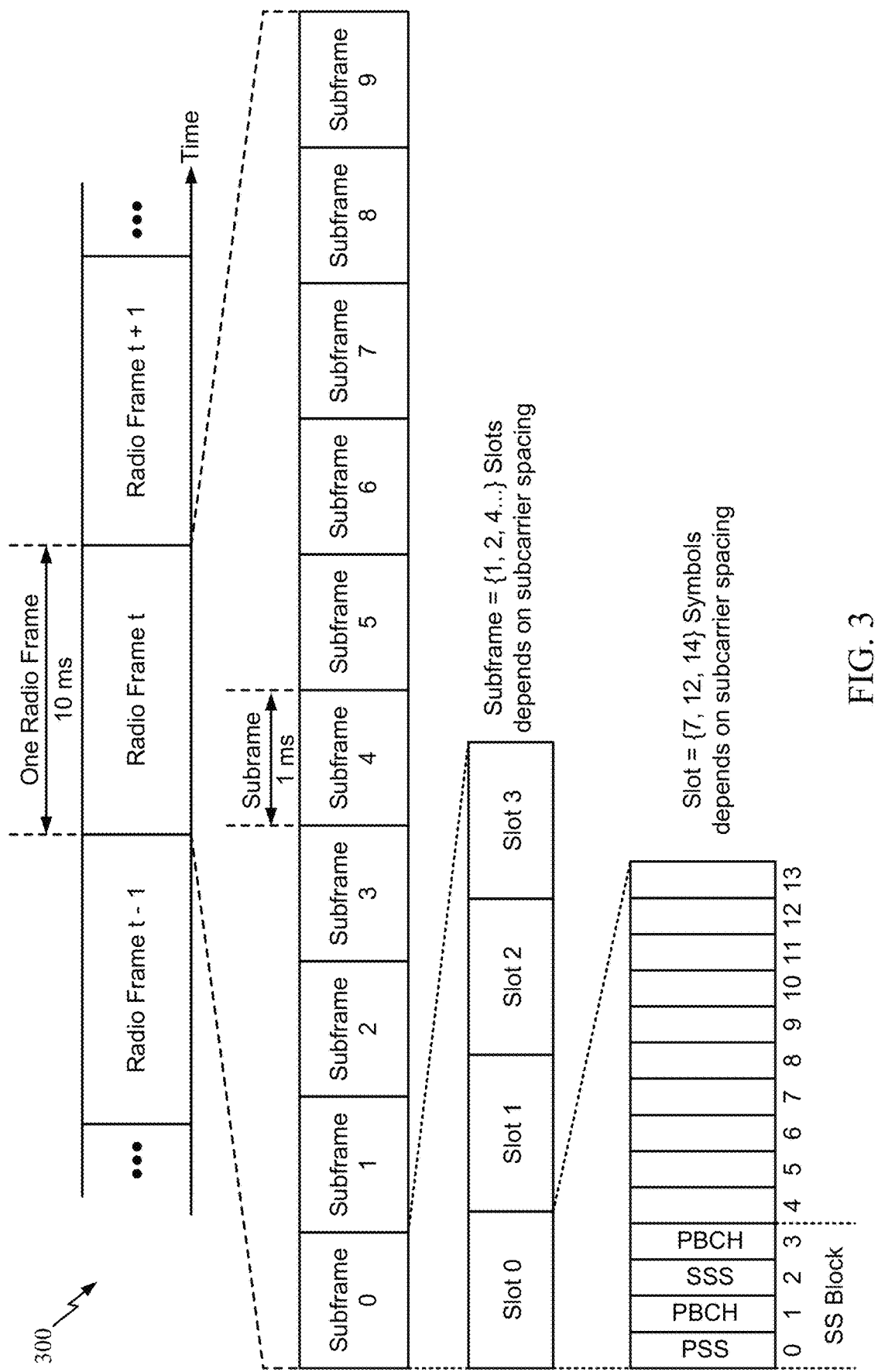
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, ... slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

Example Sidelink Communications

In some examples, the communication between a user equipment (e.g., such as the UEs 120 in the wireless communication network 100) and base station (e.g., such as the BSs 110 in the wireless communication network 100) is referred to as access link. The access link may be provided via a Uu interface. Communication between devices, such as between UEs 120, may be referred as sidelink.

In some examples, two or more subordinate entities (e.g., UEs 120) communicate with each other using sidelink signals. Real-world applications of such sidelink communications may include public safety, proximity services, UE-to-network relaying, vehicle-to-vehicle (V2V) communications, Internet of Everything (IoE) communications, Internet of Things (IoT) communications, mission-critical mesh, and/or various other suitable applications. Generally, a sidelink signal may refer to a signal communicated from one subordinate entity (e.g., UE 120*a*) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Figures 4A, 4B:
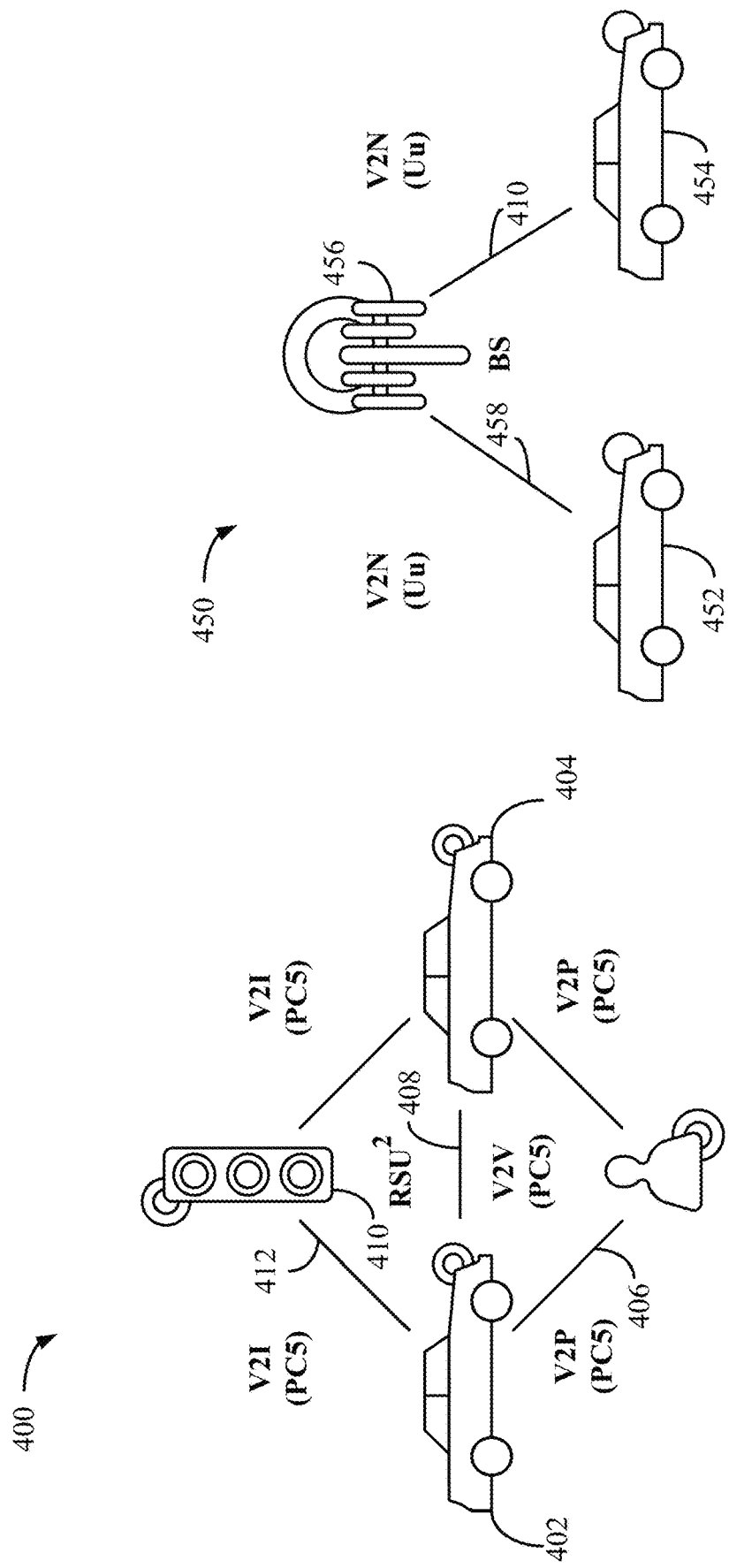
FIG. 4A and FIG. 4B show diagrammatic representations of example vehicle to everything (V2X) systems, in accordance with certain aspects of the present disclosure.

FIG. 4A and FIG. 4B show diagrammatic representations of example V2X systems, in accordance with some aspects of the present disclosure. For example, the vehicles shown in FIG. 4A and FIG. 4B may communicate via sidelink channels and may relay sidelink transmissions as described herein.

The V2X systems, provided in FIG. 4A and FIG. 4B provide two complementary transmission modes. A first transmission mode (also referred to as mode 4), shown by way of example in FIG. 4A, involves direct communications (for example, also referred to as side link communications) between participants in proximity to one another in a local area. A second transmission mode (also referred to as mode 3), shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110*a*), that sends and receives information to and from (for example, relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

As mentioned above, aspects of the present disclosure relate to sidelink communications, which can include cellular V2X (C-V2X) communications. A C-V2X system may operate in various modes. An example mode, referred to as Mode 3, may be used when the UE is in an in-coverage area. In the Mode 3, the network may control allocation of resources for the sidelink UEs. In another example mode for V2X systems, referred to as Mode 4, the sidelink UEs may autonomously select resources (e.g., resource blocks (RBs)) used for transmissions to communicate with each other. For example, resources may be semi-persistent scheduling (SPS) resources. In some examples, the sidelink UEs can autonomously select resources based on an SPS algorithm. The SPS algorithm may be configured, hardcoded, or preconfigured at the UE. For example, the SPS algorithm may be based on an SPS algorithm defined in the 3GPP technical standards.

In some cases, a "hidden terminal" scenario may occur due to the dynamically changing environment. For example, when the sidelink UE selects resources for transmissions (e.g., in the Mode 4), some other UEs (e.g., vehicles) may be hidden (e.g., undetected), such as when a channel sensing is performed. Thus, two (or more) UEs may (e.g., autonomously) select the same resources. Hidden terminal scenarios (leading to packet collision) may occur when UEs have overlapping coverage area while assigning RBs for transmission.

Figure 5A:
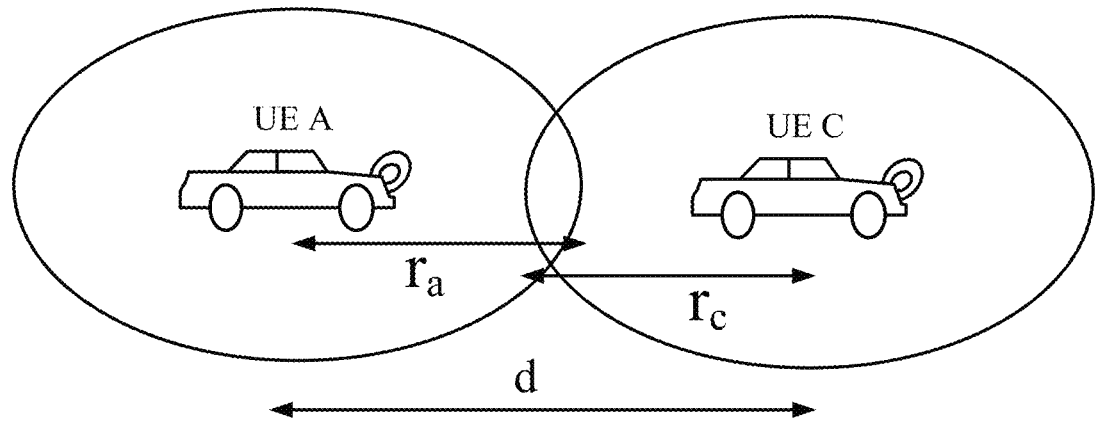
FIGS. 5A and 5B show example scenarios of vehicles at different distances from each other, in accordance with certain aspects of the present disclosure.
Figure 5B:
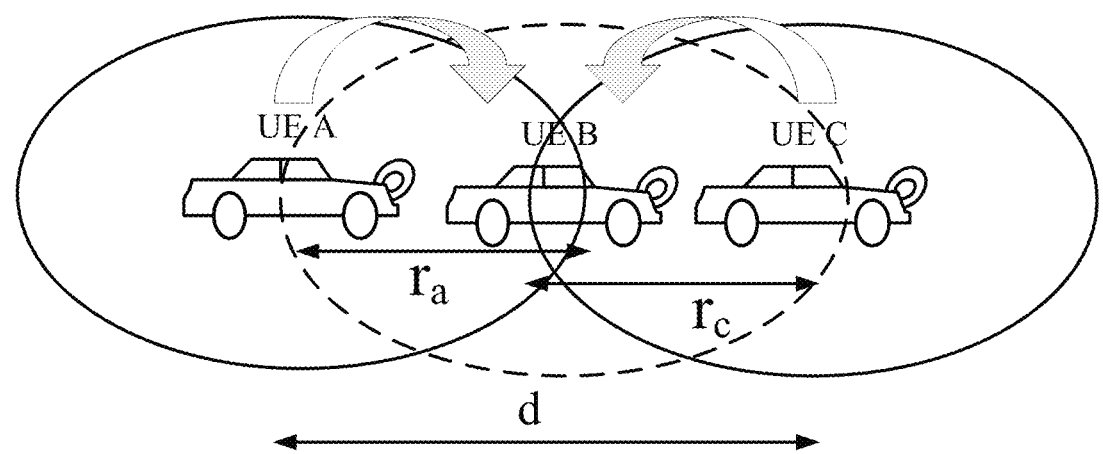

FIG. 5A illustrates a hidden terminal scenario. The UE A and UE C cannot sense each other's presence, for example, because these UEs are outside the coverage range of each other. As shown in FIG. 5A, the physical distance, d, between UE A and UE C is greater than $r_A$ and is also greater than $r_C$, where $r_A$ is the radius of UEs A's coverage and $r_C$ is the radius of UE C's coverage. UE A does not know about the existence of UE C (the "hidden node"), and similarly, UE C does not know about the existence of UE A. Because UE A and UE C do not know about the other, both UEs may allocate/select the same time-frequency resources (some or all) (e.g., overlapping RBs) for transmission. In this case, UEs in the common area of UE A and UE C (A∩C), such as UE B shown in FIG. 5B) cannot decode the data transmitted from either UE A or UE C using the allocated resources, due to the packet collision.

In some systems, a UE may select resources to transmit using a sensing mechanism. By sensing available and unavailable resources, the UE can select and transmit on vacant resources, which may reduce or prevent collisions. The sensing may involve power estimation (e.g., reference signal strength indicator (RSSI) measurements). The power estimation may exclude unmeasured subframes (e.g. due to previous transmissions). The resource selection may exclude resources based on expected conflict with other UE's transmissions. Hidden UEs; however, may be unaware of each other and, therefore, unable to exclude each other resources. Thus, transmissions by these UEs may collide on neighboring UEs.

Figure 6:
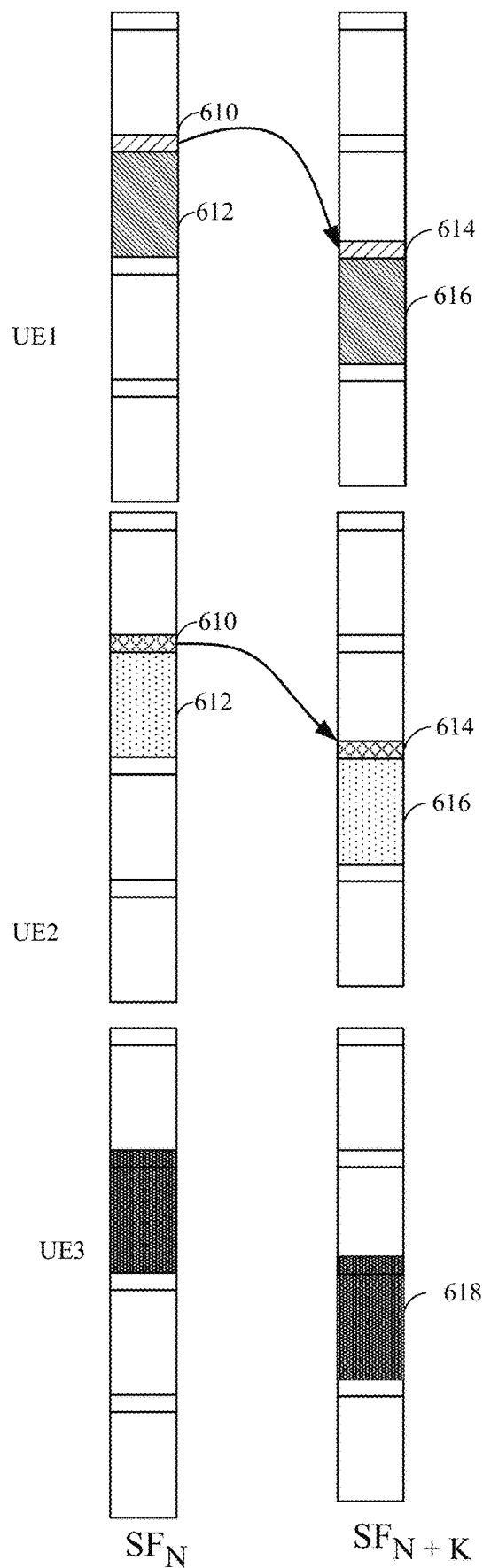
FIG. 6 illustrates example resources when assigning resource blocks in cellular V2X (C-V2X) direct communications with packet collision, in accordance with certain aspects of the present disclosure.

Collisions and overlaps may be seen in congested scenarios. FIG. 6 illustrates an example collision scenario. As shown in FIG. 6, the UE1 and UE3 may be hidden to each other. For example, the UE1 transmits SCI in PSCCH 610 and PSSCH 612 (RV0) and the UE2 may receive the UE1's PSCCH transmissions 610 and PSSCH transmission 612 and PSSCH transmissions, however, the UE3 may not detect the UE1's transmission and, therefore, does not exclude the UE1's resources from resource reselection and may use the same resources for its transmission. As shown in FIG. 6, the UE2 may receive a transmission 618 from UE3 that collides and/or overlaps with a transmission from UE1 (PSCCH 614 and PSSCH RV2 616). Although three UEs are shown in FIG. 6, the system may involve more than three UEs.

For PSCCH, bit processing may follow downlink control information (DCI) with no scrambling in cyclic redundancy check (CRC) attachment. Scrambling may be initialized with a constant (e.g., $c_{init}$=510). The PSCCH my use quadrature phase shift keying (QPSK) modulation. Layer mapping and precoding may use a single antenna port. SCI may be transmitted in the PSCCH and include a payload and uncoded bits. The same SCI may include the same transmitted symbols (e.g., coded, modulated, mapped symbols). FIG. 7 is a table of parameters for reference signals for PSCCH transmissions. The reference signals used for PSSCH may not use group or sequence hopping and uses the same orthogonal code. The reference signals for PSSCH can have cyclic shifts that provide channel separation (e.g., four randomly selected values {0, 3, 6, 9}).

Figure 8:
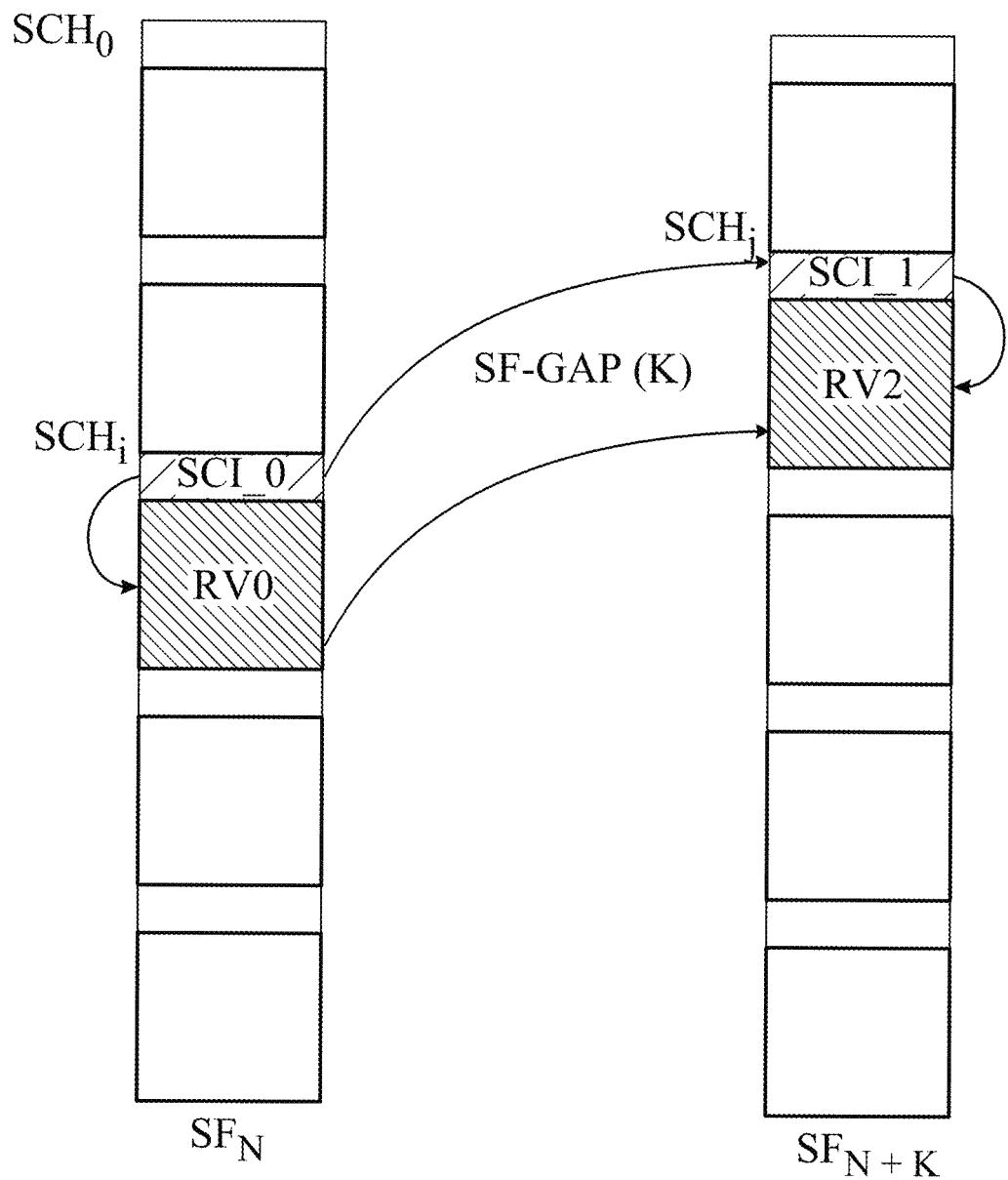
FIG. 8 illustrates example resources used for hybrid automatic repeat request (HARQ), in accordance with certain aspects of the present disclosure.

Information regarding sidelink transmissions can be obtained from the SCI sent in the PSCCH. With SPS transmissions, each SPS transmission indicates a transmission period (e.g., 20/50/100/200 . . . 1000 subframes). In this case, information regarding transmissions can be determined from the indicated periodicity of the SPS transmissions. In another example, hybrid automatic repeat request (HARD) transmissions may involve binding mechanisms and controls (e.g., 1/2/ . . . 15 subframe gaps). For example, redundancy versions (e.g., $RV_0$, $RV_2$) may be associated. Thus, information regarding one RV may be determined from information about another RV. In C-V2X transmissions, the cyclic shift for $RV_2$ may be randomly selected (similar to the cyclic shift for $RV_0$). As shown in FIG. 8, an initial transmission, SCI and PSSCH RV0, is transmitted on a first subframe $SF_N$ starting at a first sub-channel SCR and the retransmission is transmitted starting at a second sub-channel $SCH_j$ in a second subframe $SF_N$+K after a K subframe gap. The SCI_0 in subframe $SF_N$ points to the PSSCH RV0 in the subframe $SF_N$. Based on the RV0 and RV2 association, the subframe and starting sub-channel for the retransmission can be determined from the initial transmission.

In some examples, the cyclic shift used for $RV_2$ may be the same as the cyclic shift randomly selected for $RV_0$. In some cases, a notification bit may be introduced to the SCI. $RV_0$ and $RV_2$ may point to one another and may implicitly indicate SCI of a pair of RVs and/or can indicate the CS of the pair of RVs. FIG. 8 illustrates an example SCI RV pair.

In some systems (e.g., in TS 36.211 Section 9.8), for sidelink transmission modes 3 and 4 on the PSCCH, the cyclic shift to be applied is randomly selected from among {0, 3, 6, 9} in each PSCCH transmission and retransmission (e.g., according to TS 36.211 Section 14.2.1). Randomly selecting the cyclic shift may help to handle collisions.

Congestion in transmissions, such as collisions due to the hidden UE scenarios, can be detrimental to C-V2X communications and can lead to competition (e.g. Dedicated Short Range Communication (DSRC)) promotion. Congestion in transmissions may impact packet error rate (PER) and/or information age (IA).

Accordingly, what is needed are techniques and apparatus for reducing collisions in sidelink communications.

Example Relaying Physical Sidelink Control Channel Resources in Sidelink Communications Aspects of the present disclosure provide techniques for relaying physical sidelink control channel (PSSCH) resources in sidelink communications, for example in cellular vehicle-to-anything (C-V2X) systems. For example, aspects may help to enable no-cost relaying to avoid collisions in the "hidden terminal" scenarios discussed above with respects to FIG. 5-8.

Aspects of the present disclosure involve relaying PSCCH transmissions to reinforce (e.g., echoing on the same resources) the PSCCH transmissions. Reinforcing PSCCH transmissions may include transmitting sidelink control information (SCI) on the same resources by multiple sidelink devices. Some aspects provide for combining reinforcement by using the same cyclic shift for the echoed SCI transmissions. Some aspects provide for diversity reinforcement by using different cyclic shifts for the echoed SCI transmissions.

While some of the figures and examples in the present disclosure refer to three user equipments (e.g., UE1, UE2, UE3), aspects of the present disclosure can apply to any number of UEs. For example, there can be multiple hidden/aggressor terminals, multiple victim UEs, etc.

Figure 9:
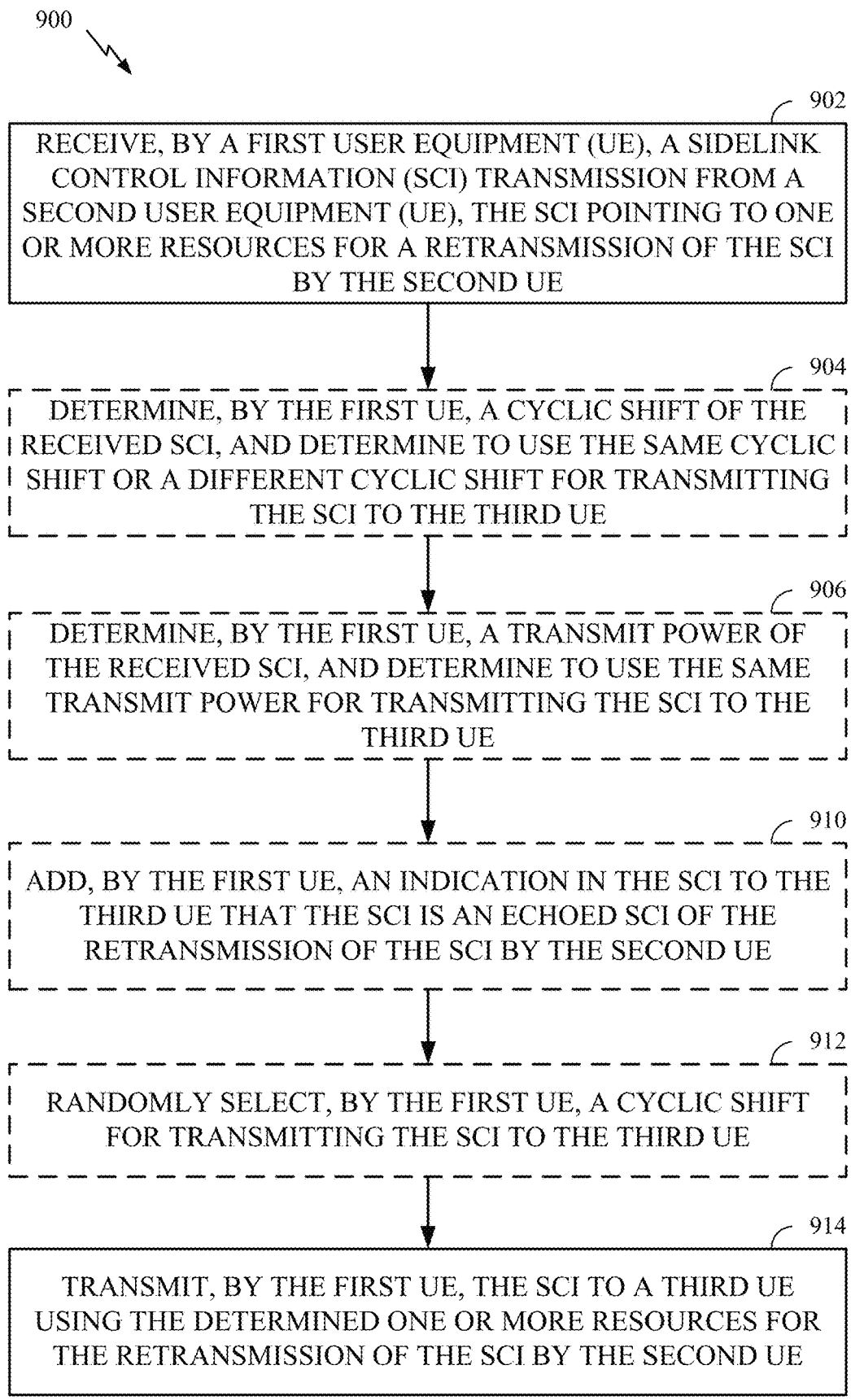
FIG. 9 is a flow diagram illustrating example operations for wireless communication by a first UE, in accordance with certain aspects of the present disclosure.
Figure 10:
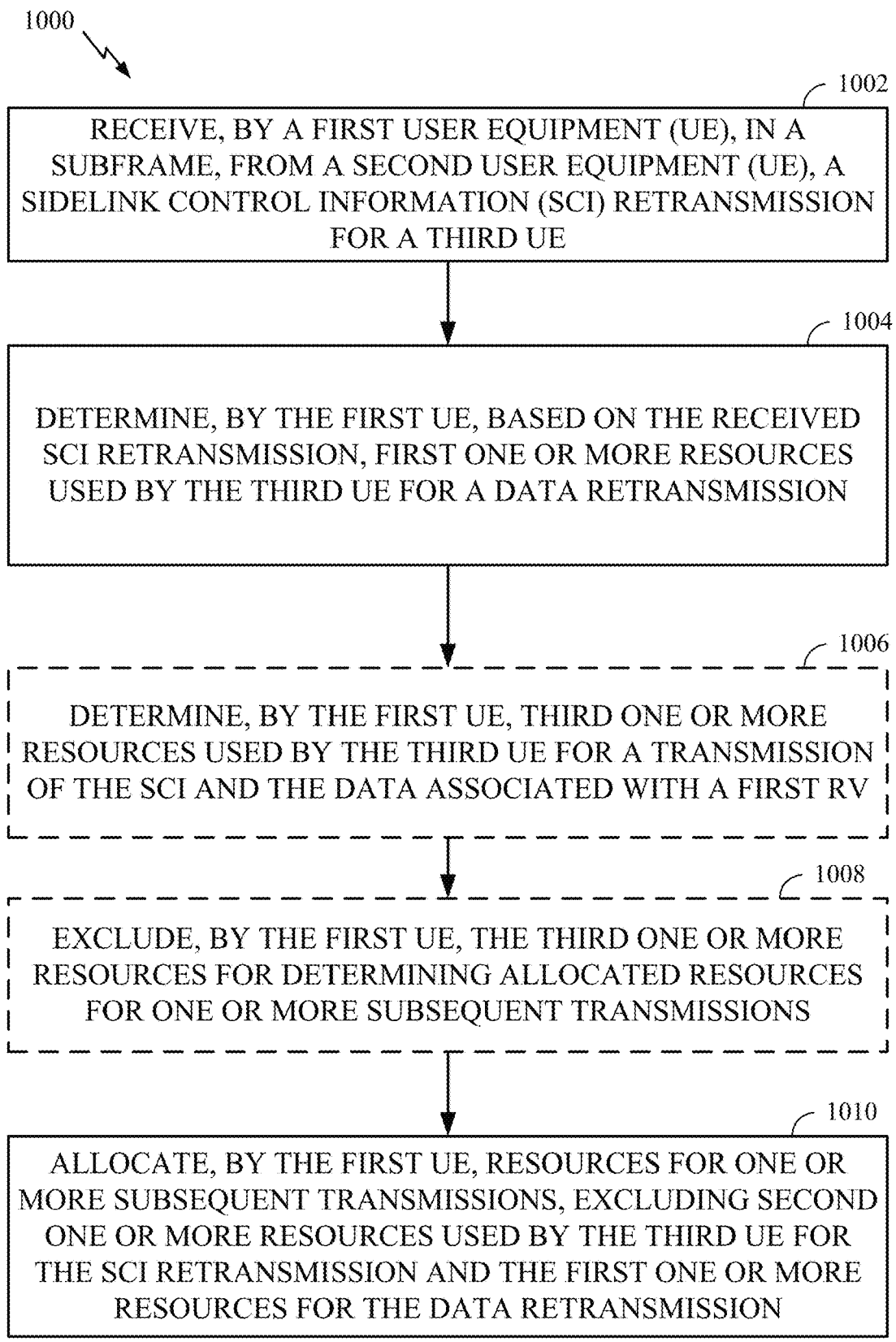
FIG. 10 is a flow diagram illustrating example operations for wireless communication by a first UE, in accordance with certain aspects of the present disclosure.

FIG. 9 and FIG. 10 are flow diagrams illustrating example operations 900 and 1000, respectively, for wireless communication, in accordance with certain aspects of the present disclosure. The operations 900 and 1000 may be performed, for example, by a first user equipment (e.g., the UE 120a in the wireless communication network 100). The operations 900 and 1000 may be implemented as software components that are executed and run on one or more processors (e.g., controller/processor 280 of FIG. 2). Further, the transmission and reception of signals by the UE in operations 900 and 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at 902, by receiving an SCI transmission from a second UE, the SCI pointing to one or more resources for a retransmission of the SCI by the second UE.

In some aspects, at 904, the UE determines a cyclic shift of the received SCI, and determines to use the same cyclic shift or a different cyclic shift for transmitting the SCI to the third UE.

In some aspects, at 906, the UE determines a transmit power of the received SCI, and determines to use the same transmit power for transmitting the SCI to the third UE.

In some aspects, at 910, the UE adds an indication to the SCI to the third UE that the SCI is an echoed SCI of the retransmission of the SCI by the second UE.

In some aspects, at 912, the UE randomly selects a cyclic shift for transmitting the SCI to the third UE.

At 914, the UE transmits the SCI to a third UE using the one or more resources for the retransmission. In some examples, when the UE transmits the SCI to a third UE, the UE may broadcast, groupcast, or unicast the SCI.

The operations 1000 may begin, at 1002, by receiving, from a second UE, an SCI retransmission for a third UE.

At 1004, the UE determines, based on the received SCI retransmission, first one or more resources used by the third UE for a data retransmission.

In some cases, at 1006, the UE determines one or more resources used by the third UE for a transmission of the SCI and the data associated with a first redundancy version (RV).

In some cases, at 1008, the UE excludes the resource(s) for determining allocated resources for one or more subsequent transmissions.

At 1010, the UE allocates resources for one or more subsequent transmissions, excluding second one or more resources used by the third UE for the SCI retransmission and the first one or more resources for the data retransmission.

According to certain aspects, when multiple UEs (e.g., UE1, UE3) are scheduled to transmit on the same subframe (e.g., on a non-overlapped RV, such as $RV_2$), a neighboring UE may reinforce the PSCCH transmission(s) of one or more of the UEs by relaying/echoing the PSCCH transmissions on the same RV resources. In some aspects, relaying the PSCCH transmissions involves echoing the PSCCH transmissions containing the same SCI(s). For example, a first aggressor UE and a second aggressor UE transmit on the same resources to a neighboring UE, the neighboring UE echoes the PSCCH transmissions of the first aggressor UE. When the second aggressor UE receives the echo of the PSCCH transmissions from the neighboring UE, the aggressor UE abstains from further transmissions using the same resources as the previous transmission.

Figure 11:
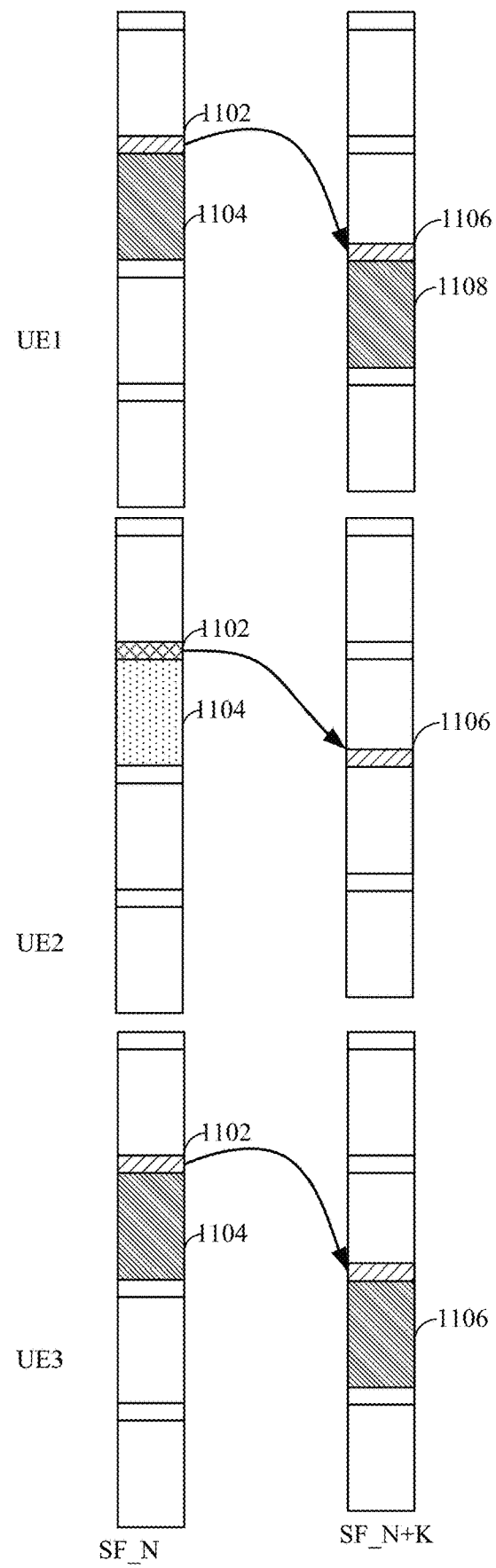
FIG. 11 illustrates example call flow when relaying resource blocks in C-V2X direct communications to avoid packet collision, in accordance with certain aspects of the present disclosure.

As shown in FIG. 11, in a first subframe SF_N the UE2 receives UE1's initial transmission, $RV_0$ PSCCH transmission 1102, which may provide SCI and information about the PSSCH $RV_0$ transmission 1104, and use the SCI to receive the PSSCH $RV_0$ transmission 1104 in the SF_N. As discussed above with respect to the FIG. 6, the UE3 may be "hidden" and does not receive the UE1's transmission in SF_N. Based on UE1's $RV_0$ transmission, the UE2 may determine the location (e.g., the subframe and starting sub-channel) of UE1's corresponding $RV_2$ transmission (e.g., based on a configured/known association between the $RV_0$ and $RV_2$). For example, UE2 determines the location of the UE1's PSCCH 1106 and PSSCH 1108 retransmissions in the subframe SF_N+K and UE2 echoes UE1's PSCCH 1106 $RV_2$ retransmission in the same subframe SF_N+K. UE2 may echo the PSCCH 1106 without the corresponding PSSCH 1108. The UE3 may detect the echoed PSCCH 1106 retransmission of UE1 from UE2, even when UE3 cannot detect the PSCCH 1106 from the UE1. Thus, the UE3 becomes aware of the resources of UE1. For example, the UE3 may determine UE1's corresponding $RV_0$ transmission (PSCCH 1102 and PSSCH 1104) based on the received echoed $RV_2$ PSCCH transmission 1106. The UE3 may then exclude the UE1 resources and perform a new resource selection.

In some aspects, the relayed/echoed PSCCH may use the same power as the power used by the neighboring (e.g., the relaying/echoing) UE for transmitting its own PSSCH transmissions. The power used by the neighboring UE may be a 3 dB boost over the power used for its PSSCH transmission.

In some aspects, when the cyclic shift is known, then the neighboring UE may control the reinforcement type (e.g., combining or diversity). In some aspects, when the cyclic shift is unknown, the neighboring UE may randomly select the cyclic shift for the reinforcement PSCCH.

Aspects of the present disclosure allow for multiple PSCCH transmissions between the aggressor UEs and the neighboring UEs.

Some aspects allow for PSCCH transmissions without a corresponding PSSCH transmission.

Some aspects of the present disclosure involve adding an indicator to a PSCCH transmission that indicates that the PSCCH transmission is an echoed PSCCH transmission. In some examples, the SCI may also include an indictor indicating that the PSCCH transmission passed the reference signal receive power (RSRP) threshold for the neighboring UE echoing the PSCCH transmission. In some examples, the UE receiving the relayed/echoed SCI may take the SCI into account when excluding resources for resource selection—even when the SCI is received without the corresponding PSSCH (e.g., based on the bit indicating the SCI is an echoed PSCCH transmission). Selecting different cyclic shifts between the PSCCH transmissions may reduce the probability of detection unless the indicator is not protected and not included in the cyclic redundancy check (CRC) calculation.

Control information may point to $RV_0$ for subsequent subframes. In some aspects, channel state information (CSI) (e.g., stage 2) may be reinforcement for $RV_0$ (e.g., without waiting for $RV_2$).

Aspects of the present disclosure increases CV2X coverage and enables no-cost relaying, as the relayed/echoed PSCCH transmission is done on already occupied resources.

Figure 12:
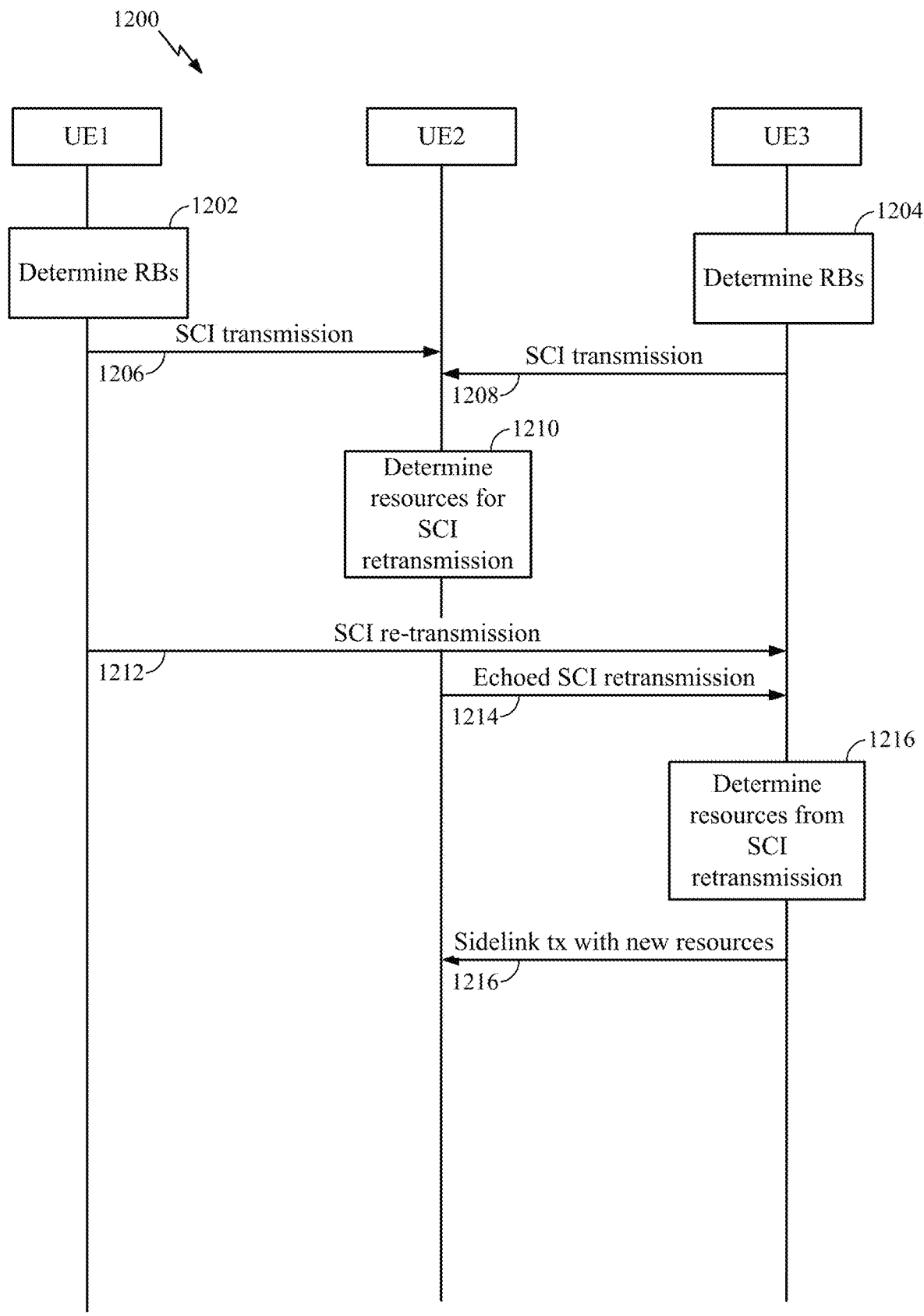
FIG. 12 illustrates example resources when assigning resource blocks in C-V2X direct communications to avoid packet collision, in accordance with certain aspects of the present disclosure.

FIG. 12 is a call flow illustrating example signaling 1200 for relaying PSSCH. As illustrated in FIG. 12, at 1202, the UE1 (e.g., the UE 120a) determines a set of resources for communicating. At 1204, the UE3 (e.g., the 120c) determines a set of resources for communication. The determinations of resources may be based on an autonomous SPS resource assignment algorithm. The UE1 and the UE3 each send information about their determined set of resources and/or a transmission using the determined resources (e.g., SCI transmission) to the UE2 (e.g., the 120*b*), at 1206 and 1208 respectively. At 1210, the UE2 determines the resources for retransmitting the SCI transmission based on the received SCI transmission from UE1. At 1214, the UE2 transmits (e.g., broadcast, unicast, or multi-casts) the SCI to UE3 using the determined resources to echo the SCI retransmission of the UE1 at 1212. In response to the SCI, UE3 excludes the determined resources and determines a new set of resources for transmission that excludes the overlapping resources at 1216, respectively. Upon determining a new set of resources, UE3 may use the new resources for further sidelink transmissions at 1218.

Figure 13:
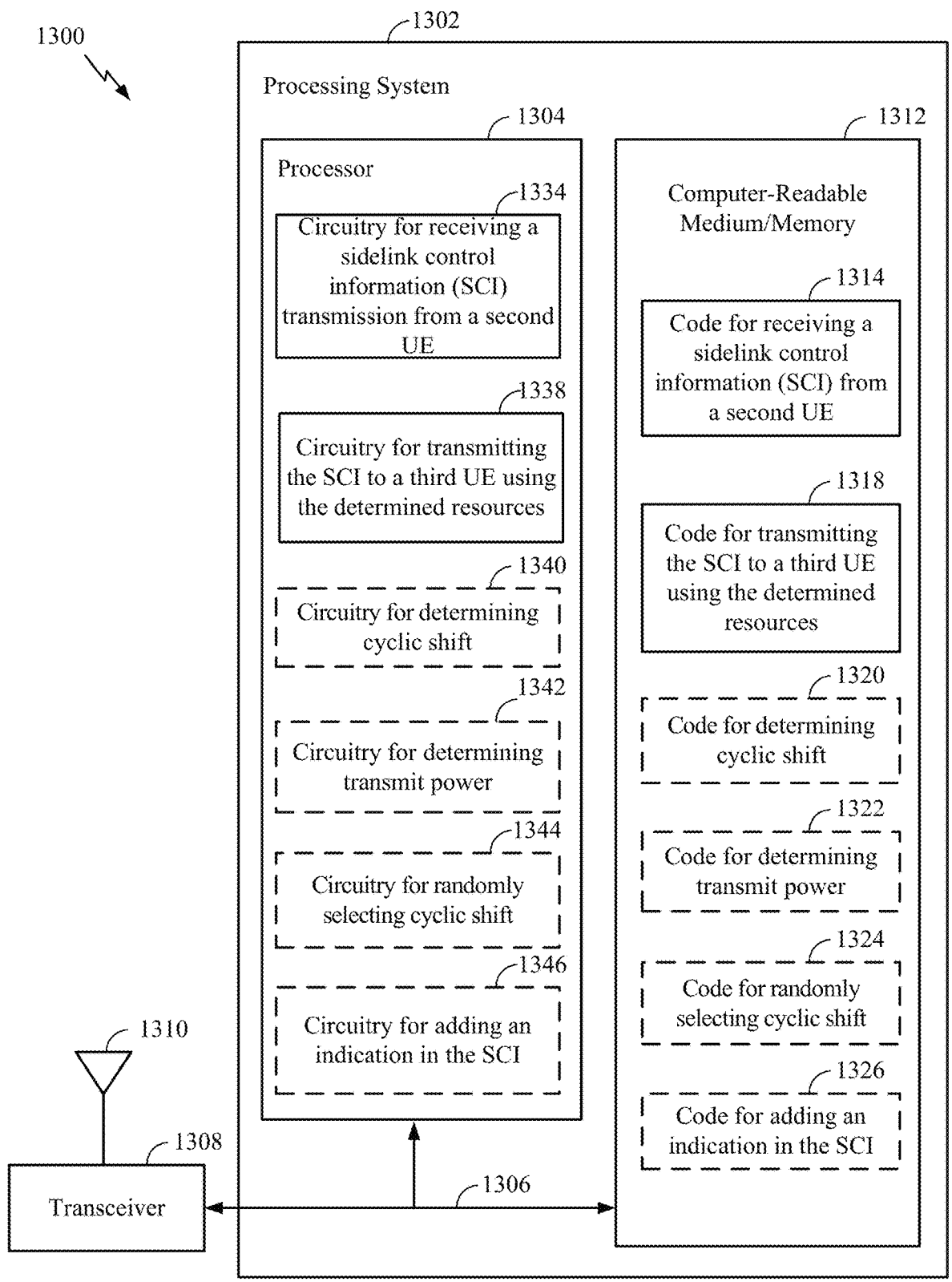
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 9. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 9, or other operations for performing the various techniques discussed herein for relaying PSCCH resources in C-V2X direct communications. In certain aspects, computer-readable medium/memory 1312 stores code 1314 for receiving an SCI transmission from a second UE, the SCI pointing to one or more resources for a retransmission of the SCI by the second UE; code 1318 for transmitting the SCI to a third UE using the one or more resources for the retransmission of the SCI by the second UE. In certain aspects, the computer-readable medium/memory 1312 may store code 1320 for determining a cyclic shift of the received SCI and determining to use the same cyclic shift or a different cyclic shift for transmitting the SCI to the third UE. In certain aspects, the computer-readable medium/memory 1312 may store code 1322 for determining a transmit power of the received SCI and for determining to use the same transmit power for transmitting the SCI to the third UE. In certain aspects, the computer-readable medium/memory 1312 may store code 1324 for adding an indication in the SCI to the third UE that the SCI is an echoed SCI of the retransmission of the SCI by the second UE. In certain aspects, the computer-readable medium/memory 1312 may store code 1326 for randomly selecting a cyclic shift for transmitting the SCI to the third UE. In certain aspects, the processor 1304 has circuitry configured to implement the code stored in the computer-readable medium/memory 1312. The processor 1304 includes circuitry 1334 for receiving an SCI from a second UE, the SCI pointing to a retransmission of the SCI; and circuitry 1338 for transmits the SCI to a third UE using the one or more resources for the retransmission. In certain aspects, the processor 1304 may include circuitry 1340 for determining a cyclic shift of the received SCI and determining to use the same cyclic shift or a different cyclic shift for transmitting the SCI to the third UE. In certain aspects, the processor 1304 may include circuitry 1342 for determining a transmit power of the received SCI and for determining to use the same transmit power for transmitting the SCI to the third UE. In certain aspects, the processor 1304 may include circuitry 1344 for adding an indication in the SCI to the third UE that the SCI is an echoed SCI of the retransmission of the SCI by the second UE. In certain aspects, the processor 1304 may include circuitry 1446 for randomly selecting a cyclic shift for transmitting the SCI to the third UE.

For example, means for transmitting (or means for outputting for transmission) may include the transmitter unit 254 and/or antenna(s) 252 of the UE 120*a* illustrated in FIG. 2 and/or circuitry 1338 of the communication device 1300 in FIG. 13. Means for receiving (or means for obtaining) may include a receiver and/or antenna(s) 252 of the UE 120*a* illustrated in FIG. 2 and/or circuitry 1334 of the communication device 1300 in FIG. 13. Means for communicating may include a transmitter, a receiver or both. Means for generating, means for performing, means for determining, means for taking action, means for determining, means for coordinating may include a processing system, which may include one or more processors, such as the receive processor 258, the transmit processor 264, the TX MIMO processor 266, and/or the controller/processor 280 of the UE 120*a* illustrated in FIG. 2 and/or the processing system 1302 of the communication device 1300 in FIG. 13.

Figure 14:
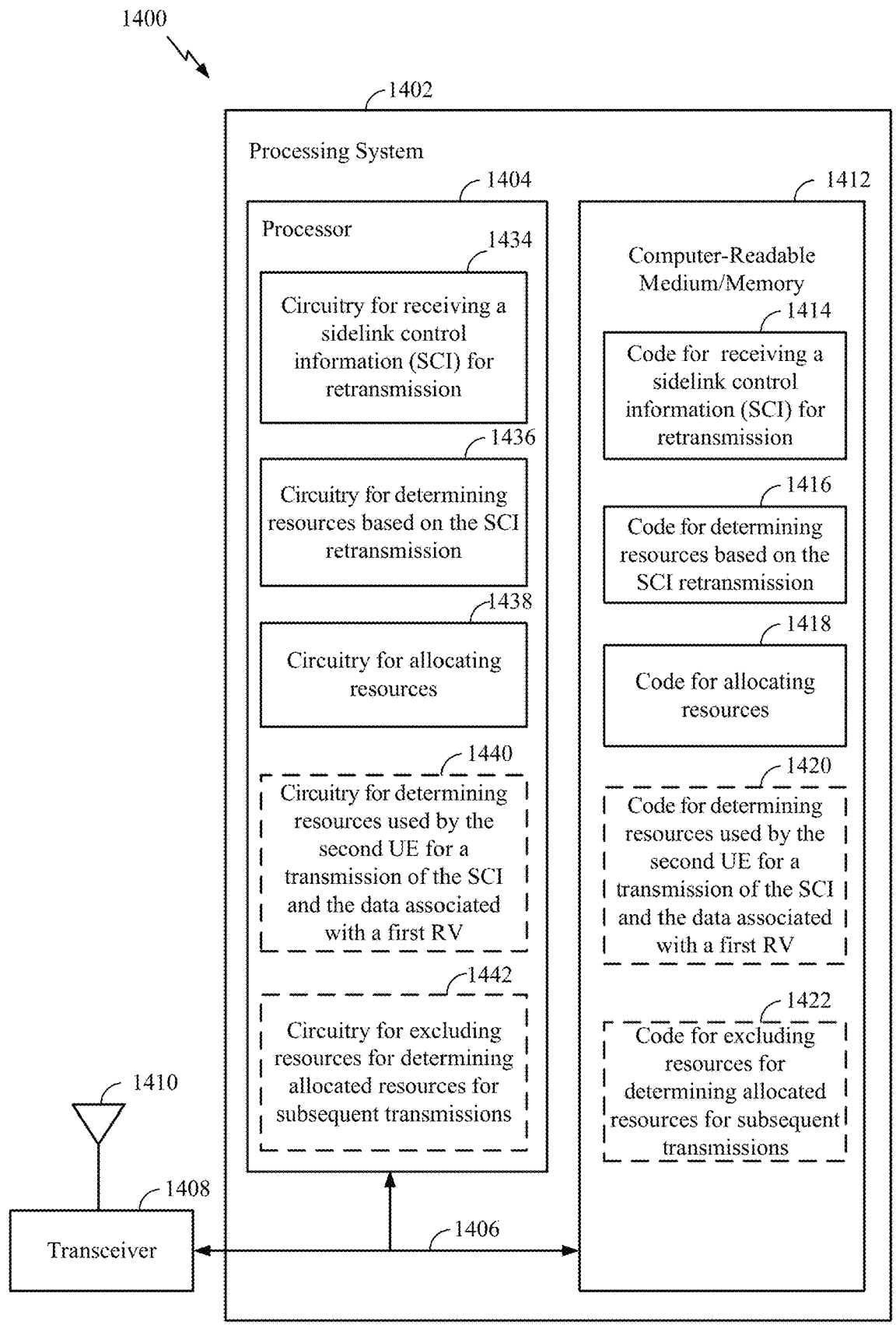
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 10. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1506. In certain aspects, the computer-readable medium/memory 1412 is configured to store instructions (e.g., computer-executable code) that when executed by the processor 1404, cause the processor 1404 to perform the operations illustrated in FIG. 10, or other operations for performing the various techniques discussed herein for relaying PSCCH resources in C-V2X direct communications. In certain aspects, computer-readable medium/memory 1412 stores code 1414 for receiving, from a second UE, a SCI retransmission for a third UE; code 1416 for determining, based on the received SCI retransmission, first one or more resources used by the third UE for a data retransmission; and code 1418 for allocating resources for one or more subsequent transmissions, excluding second one or more resources used by the third UE for the SCI retransmission and the first one or more resources for the data retransmission. In certain aspects, computer-readable medium/memory 1412 may store code 1420 for determining third one or more resources used by the third UE for a transmission of the SCI and the data associated with a first RV; and code 1422 for excluding the third one or more resources for determining allocated resources for one or more subsequent transmissions. In certain aspects, the processor 1404 has circuitry configured to implement the code stored in the computer-readable medium/memory 1412. The processor 1404 includes circuitry 1434 for receiving, from a second UE, a SCI retransmission for a third UE; circuitry 1436 for determining first one or more resources used by the third UE for the SCI retransmission and second one or more resources used by the third UE for a data retransmission associated with the SCI, based on the received SCI retransmission; and code 1438 for excluding the first and second one or more resources for determining allocated resources for one or more subsequent transmissions. In certain aspects, processor 1404 may include circuitry 1440 for determining third one or more resources used by the third UE for a transmission of the SCI and the data associated with a first RV; and circuitry 1442 for excluding the third one or more resources for determining allocated resources for one or more subsequent transmissions.

For example, means for transmitting (or means for outputting for transmission) may include the transmitter unit 254 and/or antenna(s) 252 of the UE 120*a* illustrated in FIG. 2. Means for receiving (or means for obtaining) may include a receiver and/or antenna(s) 252 of the UE 120*a* illustrated in FIG. 2 and/or circuitry 1434 of the communication device 1400 in FIG. 14. Means for communicating may include a transmitter, a receiver or both. Means for generating, means for performing, means for determining, means for taking action, means for determining, means for coordinating may include a processing system, which may include one or more processors, such as the receive processor 258, the transmit processor 264, the TX MIMO processor 266, and/or the controller/processor 280 of the UE 120*a* illustrated in FIG. 2 and/or the processing system 1402 of the communication device 1400 in FIG. 14.

Example Aspects

Implementation examples are described in the following numbered aspects:

Aspect 1: A method for wireless communication by a first user equipment (UE), comprising: receiving a sidelink control information (SCI) transmission from a second UE, the SCI pointing to one or more resources for a retransmission of the SCI by the second UE; and transmitting the SCI to a third UE using the one or more resources for the retransmission of the SCI by the second UE.

Aspect 2: The method of aspect 1, wherein the SCI is associated with a first redundancy version (RV) and the retransmission of the SCI is associated with a second RV.

Aspect 3: The method of aspect 2, wherein the determining the one or more resources for the retransmission of the SCI based the first received SCI comprises determining the one or more resources based on a preconfigured association between the first RV and the second RV.

Aspect 4: The method of any of aspects 1-3, wherein the determining the one or more resources comprises determining one or more resources comprise frequency and time resources for the retransmission of the SCI.

Aspect 5: The method of any of aspects 1-4, further comprising: determining a cyclic shift of the received SCI; and using the cyclic shift of the received SCI for transmitting the SCI to the third UE.

Aspect 6: The method of any of aspects 1-5, further comprising: determining a cyclic shift of the received SCI; and using a different cyclic shift for transmitting the SCI to the third UE.

Aspect 7: The method of any of aspects 1-6, further comprising: determining a transmit power of the received SCI; and using the same transmit power for transmitting the SCI to the third UE.

Aspect 8: The method of any of aspects 1-7, further comprising randomly selecting a cyclic shift for transmitting the SCI to the third UE.

Aspect 9: The method of any of aspects 1-8, wherein transmitting the SCI to the third UE comprises transmitting the SCI to the third UE in a subframe and not transmitting data to the third UE in the subframe with the SCI.

Aspect 10: The method of any of aspects 1-9, further comprising adding an indication in the SCI to the third UE that the SCI is an echoed SCI of the retransmission of the SCI by the second UE.

Aspect 11: The method of any of aspects 1-10, wherein: the first UE, the second UE, and the third UE are configured for cellular vehicle-to-anything (CV2X) communications; the first UE is configured to transmit the SCI to the third UE in a physical sidelink control channel (PSCCH); the first UE is configured to receive the SCI from the second UE in a PSCCH in a subframe; and the first UE is configured to receive data in a physical sidelink shared channel (PSSCH) from the second UE in the subframe with the SCI.

Aspect 12: A method for wireless communication by a first user equipment (UE), comprising: receiving, from a second UE, a sidelink control information (SCI) retransmission for a third UE; determining, based on the received SCI retransmission, first one or more resources used by the third UE for a data retransmission; and allocating resources for one or more subsequent Aspect 13: The method of aspect 12, wherein: the SCI retransmission and the data retransmission are associated with a second redundancy (RV); and the method further comprises: determining third one or more resources used by the third UE for a transmission of the SCI associated with a first RV and a transmission of the data associated with the first RV; and excluding the third one or more resources for the one or more subsequent transmissions.

Aspect 14: The method of any of aspects 12-13, wherein determining the third one or more resources comprises determining the third one or more resources based on a preconfigured association between the first RV and the second RV.

Aspect 15: The method of any of aspects 12-14, wherein the first one or more resources, the second one or more resources, and the third one or more resources comprise frequency resources and time resources.

Aspect 16: The method of any of aspects 12-15, wherein the SCI retransmission from the second UE is received in a subframe without a data transmission in the subframe from the second UE.

Aspect 17: The method of any of aspects 12-16, wherein the SCI retransmission from the second UE comprises an indication that the SCI is an echoed SCI of the retransmission of the SCI by the third UE.

Aspect 18: The method of any of aspects 12-17, wherein: the first UE, the second UE, and the third UE are configured for cellular vehicle-to-anything (CV2X) communications; the first UE is configured to receive the SCI retransmissions in a physical sidelink control channel (PSCCH); and the first UE is configured to receive data in a physical sidelink shared channel (PSSCH) from the second UE in a subframe with the SCI.

Aspect 19: The method of any of aspects 12-18, wherein excluding the one or more resources comprises excluding the first and second one or more resources when autonomously determining allocated resources according to a semi-persistent scheduling (SPS) resource allocation algorithm.

Aspect 20: An apparatus comprising means for performing the method of any of aspects 1 through 19.

Aspect 21: An apparatus comprising at least one processor and a memory coupled to the at least one processor, the memory comprising code executable by the at least one processor to cause the apparatus to perform the method of any of aspects 1 through 19.

Aspect 22: A computer readable medium storing computer executable code thereon for wireless communications that, when executed by at least one processor, cause an apparatus to perform the method of any of aspects 1 through 19.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communication by a first user equipment (UE), the apparatus comprising:
   one or more processors; and
   a memory coupled to the one or more processors, the memory comprising code executable by the one or more processors to, individually or collectively, cause the apparatus to:
      receive a sidelink control information (SCI) transmission from a second user equipment (UE), the SCI pointing to one or more resources for a retransmission of the SCI by the second UE; and
      transmit the SCI to a third UE using the one or more resources for the retransmission of the SCI by the second UE.

2. The apparatus of claim 1, wherein the SCI is associated with a first redundancy version (RV) and the retransmission of the SCI is associated with a second RV.

3. The apparatus of claim 2, wherein the memory further comprises code executable by the one or more processors to cause the apparatus to determine the one or more resources for the retransmission of the SCI based on a preconfigured association between the first RV and the second RV.

4. The apparatus of claim 1, wherein the one or more resources comprise frequency and time resources for the retransmission of the SCI.

5. The apparatus of claim 1, wherein the memory further comprises code executable by the one or more processors to cause the apparatus to:
   determine a cyclic shift of the received SCI; and
   use the cyclic shift of the received SCI for transmitting the SCI to the third UE.

6. The apparatus of claim 1, wherein the memory further comprises code executable by the one or more processors to cause the apparatus to:
   determine a cyclic shift of the received SCI; and
   use a different cyclic shift for transmitting the SCI to the third UE.

7. The apparatus of claim 1, wherein the memory further comprises code executable by the one or more processors to cause the apparatus to:
   determine a transmit power of the received SCI; and
   use the same transmit power for transmitting the SCI to the third UE.

8. The apparatus of claim 1, wherein the memory further comprises code executable by the one or more processors to cause the apparatus to randomly select a cyclic shift for transmitting the SCI to the third UE.

9. The apparatus of claim 1, wherein the code executable by the one or more processors to cause the apparatus to transmit the SCI to the third UE comprises code executable by the one or more processors to cause the apparatus to transmit the SCI to the third UE in a subframe and not transmit data to the third UE in the subframe with the SCI.

10. The apparatus of claim 1, wherein the memory further comprises code executable by the one or more processors to cause the apparatus to add an indication in the SCI to the third UE that the SCI is an echoed SCI of the retransmission of the SCI by the second UE.

11. The apparatus of claim 1, wherein:
   the apparatus, the second UE, and the third UE are configured for cellular vehicle-to-anything (CV2X) communications;
   the apparatus is configured to transmit the SCI to the third UE in a physical sidelink control channel (PSCCH);
   the apparatus is configured to receive the SCI from the second UE in a PSCCH in a subframe; and
   the apparatus is configured to receive data in a physical sidelink shared channel (PSSCH) from the second UE in the subframe with the SCI.

12. A method for wireless communication by a first user equipment (UE), the method comprising:
   receiving a sidelink control information (SCI) transmission from a second UE, the SCI pointing to one or more resources for a retransmission of the SCI by the second UE; and
   transmitting the SCI to a third UE using the one or more resources for the retransmission of the SCI by the second UE.

13. The method of claim 12, wherein the SCI is associated with a first redundancy version (RV) and the retransmission of the SCI is associated with a second RV, and further comprising determining the one or more resources for the retransmission of the SCI based on preconfigured association between the first RV and the second RV.

14. The method of claim 12, further comprising:
   determining a cyclic shift of the received SCI; and
   using the cyclic shift of the received SCI for transmitting the SCI to the third UE.

15. The method of claim 12, further comprising randomly selecting a cyclic shift for transmitting the SCI to the third UE.

16. The method of claim 12, wherein transmitting the SCI to the third UE comprises transmitting the SCI to the third UE in a subframe and not transmitting data to the third UE in the subframe with the SCI.

17. The method of claim 12, further comprising adding an indication in the SCI to the third UE that the SCI is an echoed SCI of the retransmission of the SCI by the second UE.

18. The method of claim 12, wherein the one or more resources comprise frequency and time resources for the retransmission of the SCI.

19. The method of claim 12, further comprising:
determining a cyclic shift of the received SCI; and
using a different cyclic shift for transmitting the SCI to the third UE.

20. The method of claim 12, further comprising:
determine a transmit power of the received SCI; and
use the same transmit power for transmitting the SCI to the third UE.

21. The method of claim 12, wherein:
the first UE, the second UE, and the third UE are configured for cellular vehicle-to-anything (CV2X) communications;
transmitting the SCI to the third UE comprises transmitting the SCI to the third UE in a physical sidelink control channel (PSCCH);
receiving the SCI from the second UE comprises receiving the SCI from the second UE in a PSCCH in a subframe; and
the method further comprises receiving data in a physical sidelink shared channel (PSSCH) from the second UE in the subframe with the SCI.

22. An apparatus for wireless communication, the apparatus comprising:
means for receiving a sidelink control information (SCI) transmission from a second apparatus, the SCI pointing to one or more resources for a retransmission of the SCI by the second apparatus; and
transmitting the SCI to a third apparatus using the one or more resources for the retransmission of the SCI by the second apparatus.

23. The apparatus of claim 22, wherein the SCI is associated with a first redundancy version (RV) and the retransmission of the SCI is associated with a second RV.

24. The apparatus of claim 23, further comprising means for determining the one or more resources for the retransmission of the SCI based on a preconfigured association between the first RV and the second RV.

25. The apparatus of claim 22, wherein the one or more resources comprise frequency and time resources for the retransmission of the SCI.

26. The apparatus of claim 22, further comprising:
means for determining a cyclic shift of the received SCI; and
means for using the cyclic shift of the received SCI for transmitting the SCI to the third apparatus.

27. The apparatus of claim 22, further comprising:
means for determining a cyclic shift of the received SCI; and
means for using a different cyclic shift for transmitting the SCI to the third apparatus.

28. The apparatus of claim 22, further comprising:
means for determining a transmit power of the received SCI; and
means for using the same transmit power for transmitting the SCI to the third apparatus.

29. The apparatus of claim 22, further comprising means for randomly selecting a cyclic shift for transmitting the SCI to the third apparatus.

30. A non-transitory computer readable medium storing computer executable code for wireless communication by a first user equipment (UE), the computer executable code comprising:
code for receiving a sidelink control information (SCI) transmission from a second UE, the SCI pointing to one or more resources for a retransmission of the SCI by the second UE; and
code for transmitting the SCI to a third UE using the one or more resources for the retransmission of the SCI by the second UE.

\* \* \* \* \*